United States Patent
Fruh et al.

(10) Patent No.: US 8,641,317 B2
(45) Date of Patent: Feb. 4, 2014

(54) BUSHING AND COUPLING SYSTEM

(75) Inventors: Jason M. Fruh, Lone Tree, CO (US); Sam Edgar, Aurora, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 138 days.

(21) Appl. No.: 12/491,070

(22) Filed: Jun. 24, 2009

(65) Prior Publication Data
US 2010/0329780 A1 Dec. 30, 2010

(51) Int. Cl.
*B25G 3/20* (2006.01)

(52) U.S. Cl.
USPC ............. 403/371; 403/98; 403/116; 403/367

(58) Field of Classification Search
USPC ............. 403/371, 98, 368, 314, 367, 370, 70, 403/112, 408.1, 366, 224, 365, 374.3, 403/374.4, 379.4, 150, 151, 153, 154, 156, 403/157, 158, 116, 61; 248/292.14; 343/892; 411/351, 399; 384/276, 295; 464/70, 112

See application file for complete search history.

(56) References Cited

U.S. PATENT DOCUMENTS

| | | | | |
|---|---|---|---|---|
| 1,120,410 A | * | 12/1914 | Rohmer et al. | 411/26 |
| 1,382,606 A | * | 6/1921 | Norton | 403/253 |
| 1,917,431 A | * | 7/1933 | Clark | 37/455 |
| 2,846,248 A | * | 8/1958 | Kliwer | 403/379.4 |
| 3,301,581 A | * | 1/1967 | Winberg | 403/379.4 |
| 3,603,626 A | * | 9/1971 | Whiteside | 403/408.1 |
| 3,829,184 A | * | 8/1974 | Chevret | 384/280 |
| 3,841,771 A | * | 10/1974 | Shankwitz et al. | 403/163 |
| 3,851,982 A | * | 12/1974 | See | 403/224 |
| 4,077,655 A | * | 3/1978 | Skahill | 280/756 |
| 4,102,108 A | * | 7/1978 | Cody | 403/156 |
| 4,494,883 A | * | 1/1985 | Winter | 384/439 |
| 4,634,299 A | * | 1/1987 | Svensson | 384/271 |
| 4,652,167 A | * | 3/1987 | Garman | 403/158 |
| 4,886,391 A | * | 12/1989 | Ragsdale, Sr. | 403/368 |
| 5,174,680 A | * | 12/1992 | Nakamura et al. | 403/370 |
| 5,251,986 A | * | 10/1993 | Arena | 384/272 |
| 5,289,733 A | * | 3/1994 | Kallenberger | 74/447 |
| 5,674,027 A | * | 10/1997 | Warnaar | 403/404 |
| 6,232,928 B1 | * | 5/2001 | Zimmerman et al. | 343/882 |
| 6,332,735 B1 | * | 12/2001 | Wang | 403/371 |
| 6,390,483 B1 | * | 5/2002 | Hsu et al. | 280/87.041 |
| 6,755,571 B2 | * | 6/2004 | Kajiyama | 384/276 |
| 7,113,144 B2 | * | 9/2006 | Lin et al. | 343/880 |
| 7,603,739 B2 | * | 10/2009 | Minkler et al. | 15/145 |
| 2004/0033105 A1 | * | 2/2004 | North | 403/408.1 |
| 2007/0210978 A1 | * | 9/2007 | Zihlman | 343/892 |
| 2007/0231094 A1 | * | 10/2007 | Guy | 408/239 R |
| 2008/0038053 A1 | * | 2/2008 | Lai | 403/371 |

* cited by examiner

*Primary Examiner* — Daniel P. Stodola
*Assistant Examiner* — Matthew R McMahon
(74) *Attorney, Agent, or Firm* — Seed IP Law Group PLLC

(57) ABSTRACT

A bushing includes a base portion having a central axis, a substantially circular aperture extending through the base portion along the central axis, and a plurality of tapered fingers integral with and protruding from the base portion. Each of the tapered fingers are configured to deflect from a first position in which a bolt or similar fastener may pass through the bushing to a second position in which the bushing constricts or clamps down around the bolt. A coupling system and method for rigidly securing two or more components together using one or more bushings is also provided.

12 Claims, 9 Drawing Sheets

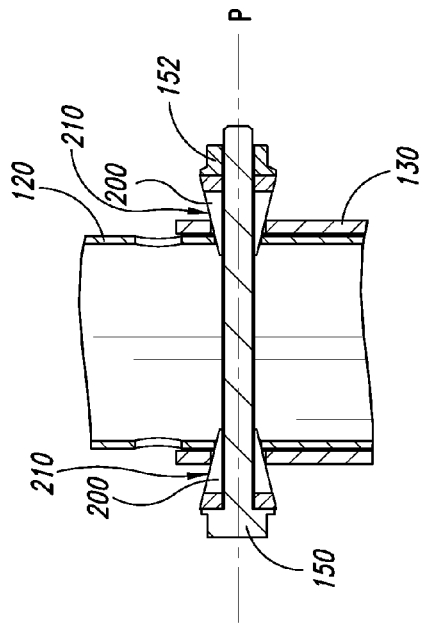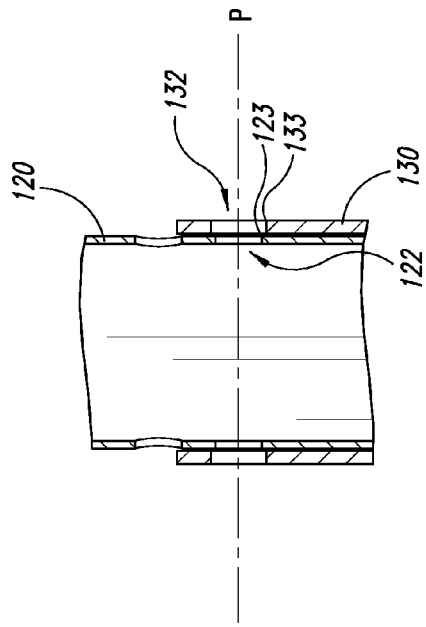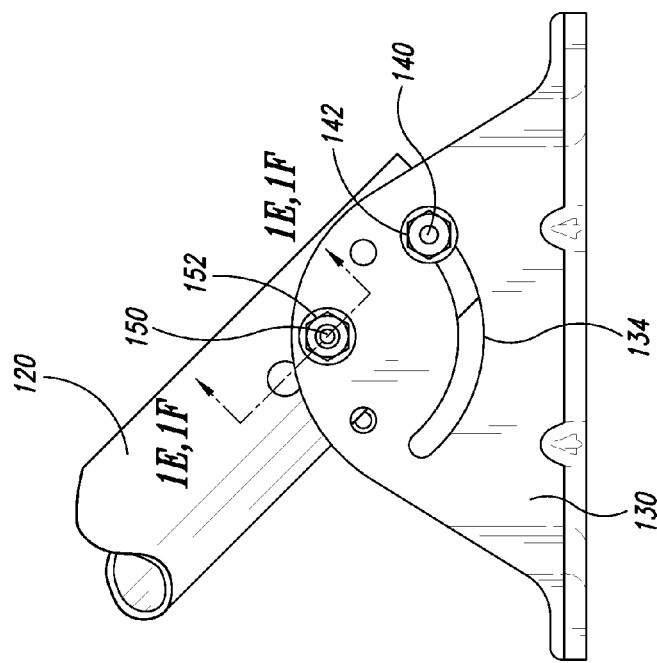

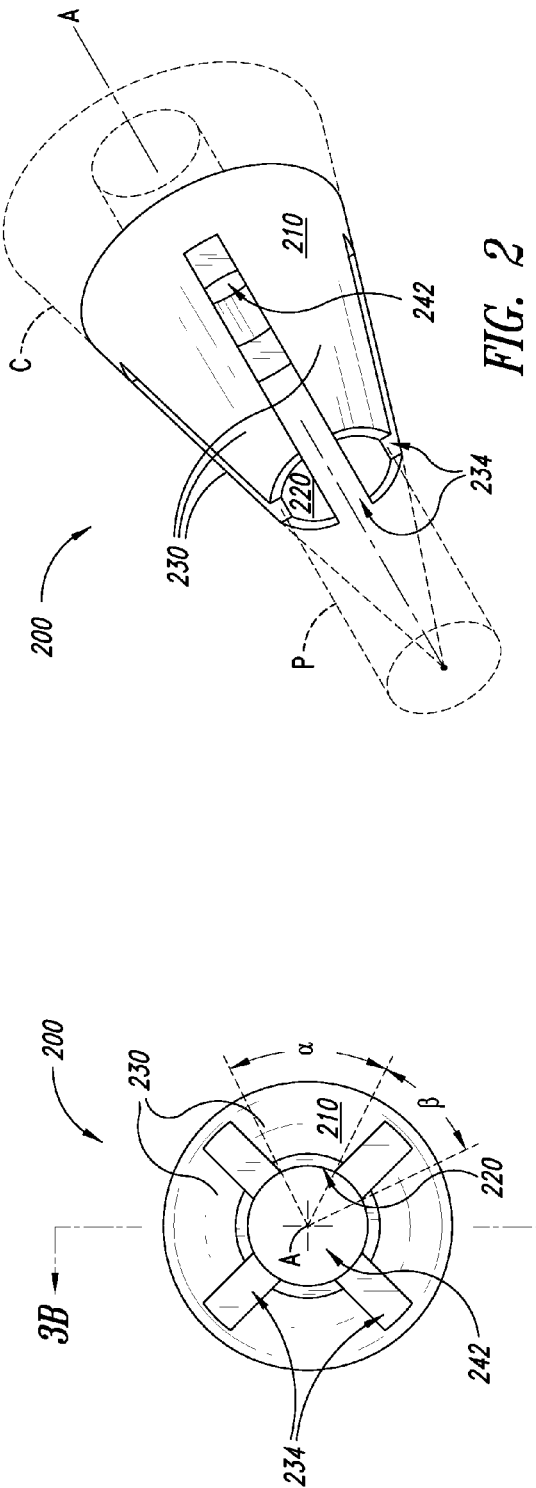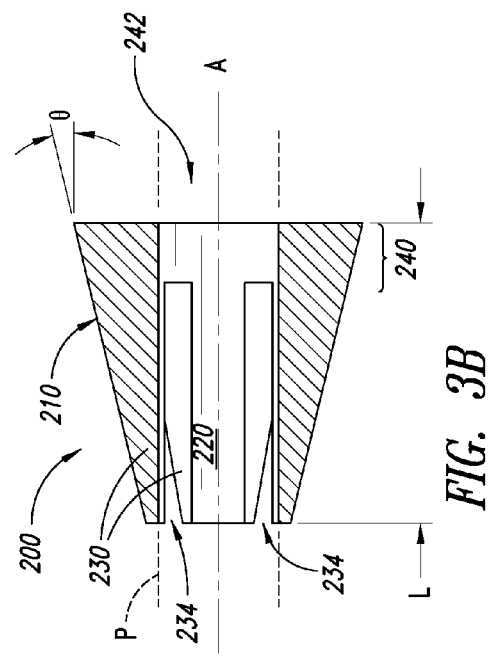

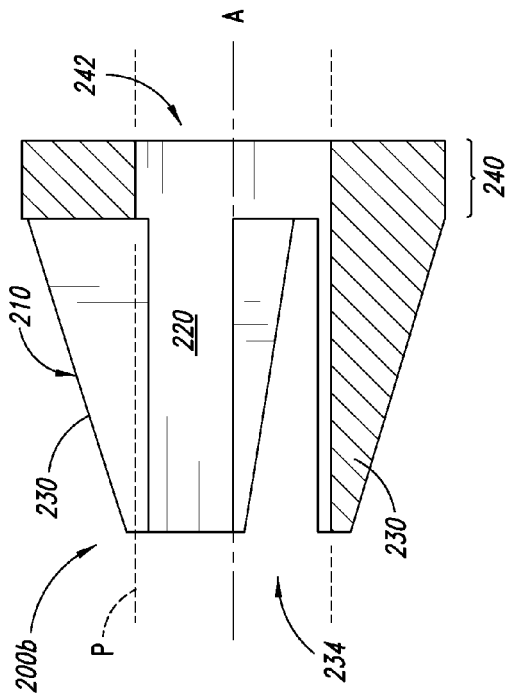
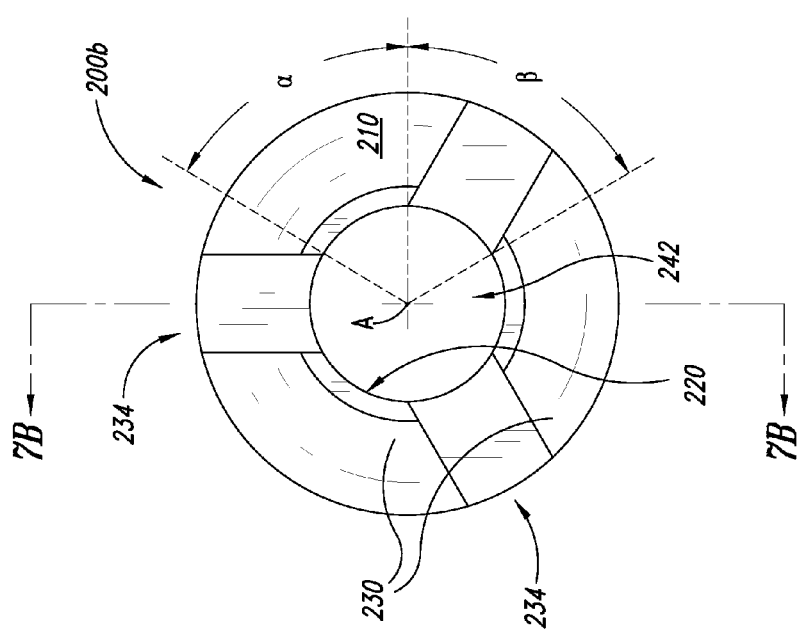
FIG. 7B
FIG. 7A

BUSHING AND COUPLING SYSTEM

BACKGROUND

1. Technical Field

The present disclosure generally relates to bushings and, more particularly, to bushings and coupling systems for rigidly securing two or more components together.

2. Description of the Related Art

Various means are used to connect one or more separate parts or components together in a rigid or semi-rigid manner. One very common connection means involves bolting components together using a standard bolt and a correspondingly sized nut. The bolt is inserted through holes formed in the components and secured to the components with the nut to form a bolted assembly. In order to accept the bolt, the holes of the components must be sized larger than the bolt, and as such, do not tightly engage the circumference of the bolt when inserted therein. In other words, there is a clearance gap or slop created between each of the component holes and the bolt. The size of the gap or extent of the slop is generally determined by the sizing of the holes and the bolt and varies in accordance with dimensional tolerances of the same. Accordingly, even in applications in which dimensional tolerances are relatively small (such as may result from various high-precision machining and manufacturing processes) there remains a gap or slop between the bolt and corresponding holes. As a result, parts or components that are bolted together have a tendency to move relative to each other when subjected to various loading conditions. This relative movement can have significant undesirable consequences when accurate positioning of the components is critical to operational safety and/or performance of the assembly.

BRIEF SUMMARY

According to various embodiments, a bushing is provided that is adapted to secure two or more components together in a particularly rigid manner. The bushing includes a base portion having a central axis, a circular aperture extending through the base portion and a plurality of elongated protrusions or fingers extending from the base and circumferentially spaced about the central axis. The elongated protrusions or fingers are movable between a first position in which an inner surface of each elongated protrusion or finger is substantially cordially aligned with the aperture of the base portion and a second position in which a portion of each elongated protrusion or finger is deflected from the first position inwardly towards the central axis. In this manner, the bushing is able to transition from a first position, in which a bolt (or similar fastener) may be easily inserted through the bushing, to a second position, in which the bushing constricts or clamps down around the bolt to rigidly secure the bushing thereto. In this second position, the bushing also engages an edge encircling an aperture on each of the components that are to be secured together. As such, the bushing concurrently engages at least an edge of each component and the bolt to substantially prevent relative movement between the components, the bushing and the bolt.

The bushing may include two or more elongated protrusions or fingers wherein each of the elongated protrusions or fingers has an outer surface substantially coextensive with a conical reference surface. Accordingly, an outer shape of at least a portion of the bushing may be substantially conical. In some embodiments, a relief feature in the form of a notch separates each of the elongated protrusions or fingers, each relief notch extending at least half of a length of the bushing. An additional relief feature, such as a groove extending circumferentially around an outer or inner surface of the bushing, may be located proximate a root portion of each of the elongated protrusions or fingers to facilitate the ability of the elongated protrusions or fingers to flex and/or deform inwardly. In some embodiments, the elongated protrusions or fingers collectively surround about half a circumference of a passageway extending through the bushing, and in other embodiments, the elongated protrusions or fingers collectively surround more or less than half the circumference of the passageway.

According to other embodiments, a coupling system is provided that includes at least one of the bushings described herein, a base structure having a first aperture, and a bracket having a second aperture. The bushing rigidly secures the base structure to the bracket such that the first aperture of the base structure is substantially coaxially aligned with the second aperture of the bracket. This may be accomplished by the bushing concurrently engaging an edge of the base structure encircling the first aperture and an edge of the bracket encircling the second aperture. As the bushing engages the edges of the base structure and bracket, the edges interact with the bushing to force a portion of the bushing towards its central axis, thereby causing the bushing to constrict or contract at this portion. In this manner, the bushing is able to constrict or clamp down around a threaded fastener (or similar fastener) that is inserted through the bushing and used to draw the bushing into engagement with the base structure and the bracket. Although the base structure and the bracket can include a variety of different sized and shaped structures, in one embodiment, the base structure is a tubular mast that may be secured to an anchoring bracket in a rigid manner to support a dish antenna coupled thereto. In such an embodiment, the coupling system is particularly adapted to rigidly secure the antenna in a desired position such that the quality of a received signal can be maintained at a relatively high standard by preventing signal degradation that may otherwise occur without such rigid attachment.

According to other embodiments, a method is provided for rigidly securing two or more components together. The method includes inserting a first bushing into a first series of successively sized apertures of at least a first and a second component; drawing the first bushing progressively into each aperture with a threaded fastener; and deflecting elongated protrusions of the first bushing inwardly towards a central axis to a position in which the elongated protrusions constrict tightly around the threaded fastener while an outer surface of each of the elongated protrusions simultaneously contacts an edge surrounding each respective aperture of the first and second components. Additionally, a second bushing substantially identical to the first bushing may be inserted into a second series of successively sized apertures in the first and second components and simultaneously drawn into the second series of apertures while drawing the first bushing progressively into the first series of apertures.

BRIEF DESCRIPTION OF THE SEVERAL VIEWS OF THE DRAWINGS

FIG. 1D is a side elevational view of a portion of the antenna system of FIG. 1A.

FIG. 1E is a detailed cross-sectional view of a portion the antenna system of FIG. 1A.

FIG. 1F is a detailed cross-sectional view of a portion the antenna system of FIG. 1A prior to insertion of the bushings and pivot bolt.

FIG. 2 is an isometric view of a bushing, according to one embodiment.

FIG. 3A is front elevational view of the bushing of FIG. 2.

FIG. 3B is a side cross-sectional view of the bushing of FIG. 2.

FIG. 7A is front elevational view of the bushing of FIG. 6.

FIG. 7B is a cross-sectional view of the bushing of FIG. 6.

DETAILED DESCRIPTION

Figure 1A:
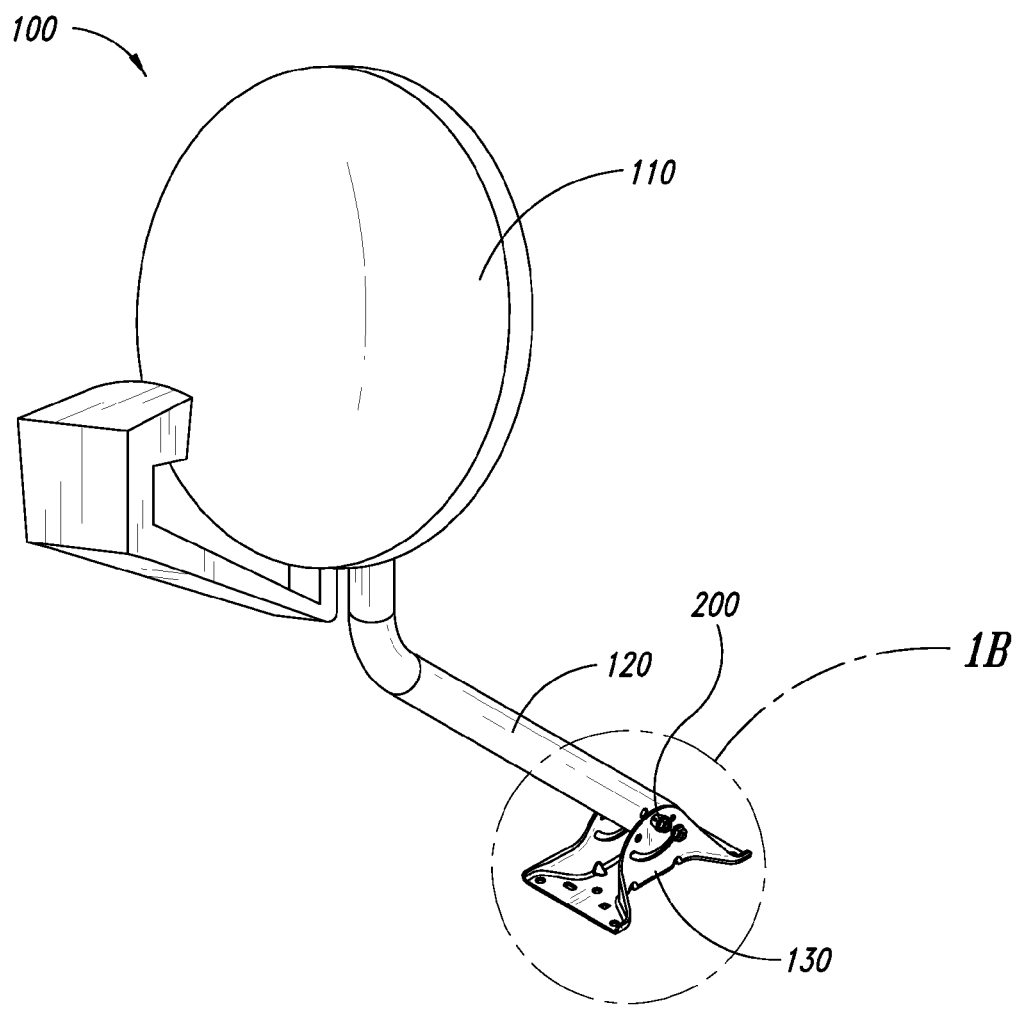
FIG. 1A is an isometric view of an antenna system having bushings for rigidly securing a mast of the antenna system to a mounting bracket.
Figure 1B:
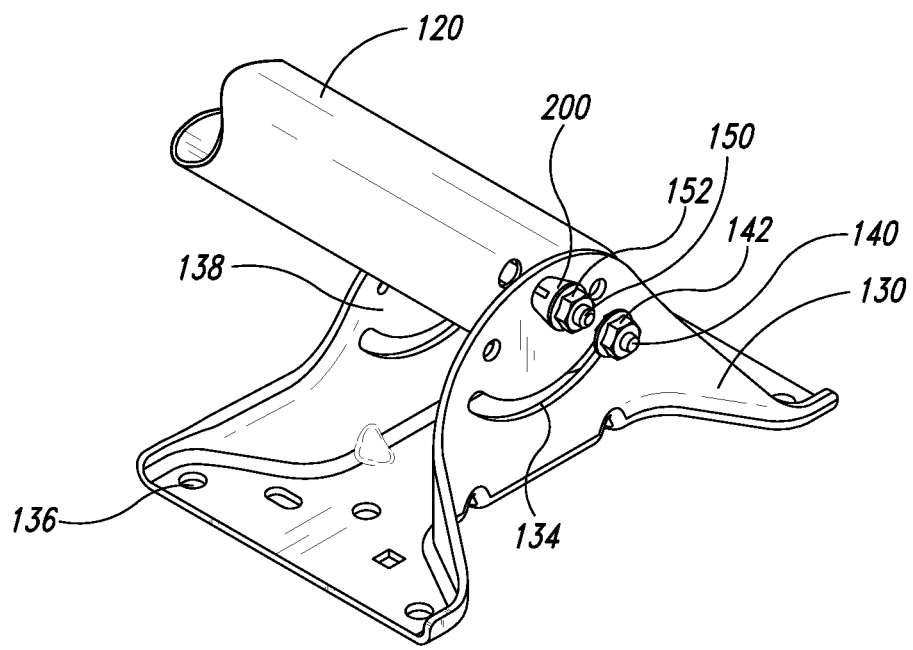
FIG. 1B is a detailed isometric view of a portion of the antenna system of FIG. 1A.
Figure 1C:
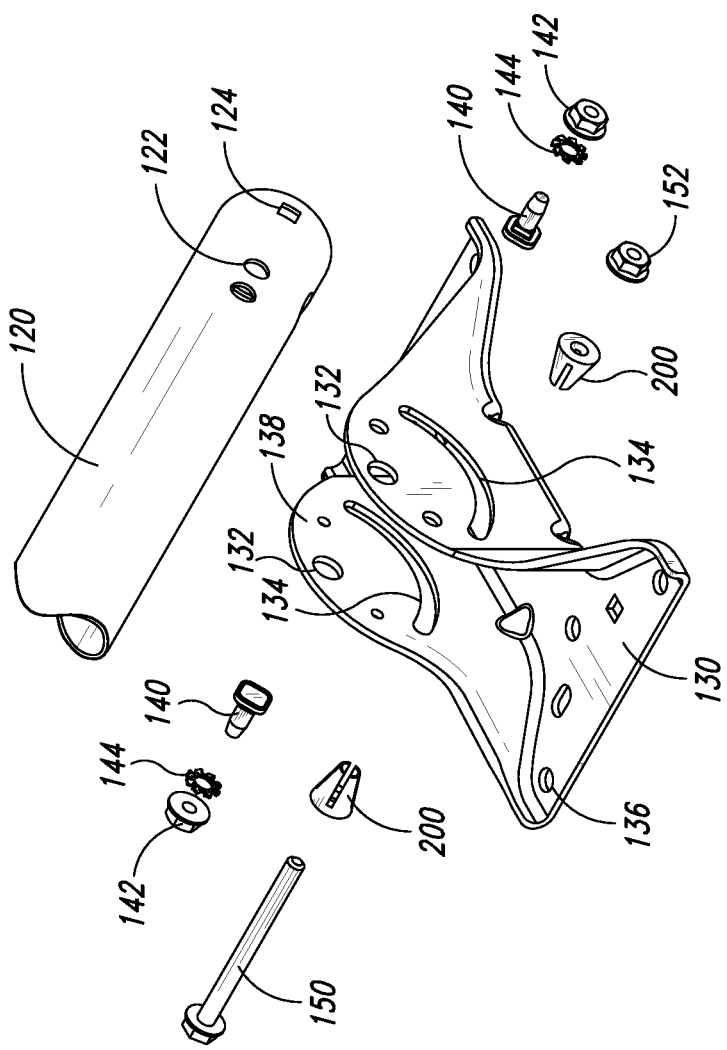
FIG. 1C is an exploded view of a portion of the antenna system of FIG. 1A.

FIG. 1A shows an antenna system 100 that includes a dish antenna 110 coupled to a mast 120 for supporting the dish antenna 110. The mast 120 extends between the dish antenna 110 and an anchoring bracket 130, which is used to anchor the antenna system 100 to a rigid structure, such as, for example, a roof or wall of a house. The dish antenna 110 is configured to transmit signals to and/or receive signals from one or more communications systems, such as one or more satellites. The accurate positioning of the dish antenna 110 is determinative of the overall quality and/or strength of received signals. Accordingly, small displacements from a preferred antenna position can result in significant signal degradation. As discussed in more detail below, the antenna system 100 includes a coupling or mounting system that includes one or more bushings 200 for rigidly securing the mast 120 to the anchoring bracket 130 to substantially prevent relative movement therebetween.

As shown in FIGS. 1A-1F, the mast 120 is tubular and includes one or more sets of pivot apertures 122 and a set of adjustment apertures 124 for securing the mast 120 to the anchoring bracket 130. The pivot apertures 122 may be formed in the mast 120 by conventional cutting, machining or manufacturing methods, such as, for example, laser cutting, stamping, punching, forging, casting, etc. and may vary in size within a dimensional tolerance, for example, ±0.030 inches. The specific dimensional tolerance of the pivot apertures 122 may depend on a number of factors, such as, for example, the type of material being processed and the cutting, machining or manufacturing method used to form the apertures 122. Consequently, the pivot apertures 122 may be characterized by a nominal size, for example, a 5/16" (0.313") diameter, but will vary in size therefrom within a dimensional tolerance.

The anchoring bracket 130 includes a substantially flat surface for engaging a corresponding mounting surface of, for example, a roof of a house, and a number of various mounting apertures 136 for bolting or otherwise securing the bracket 130 to the mounting surface. The bracket 130 further includes a pivot aperture 132 and an adjustment slot 134 on each of opposing sidewalls 138. Similar to the pivot apertures 122 of the mast 120, the pivot apertures 132 of the anchoring bracket 130 may be formed by various conventional cutting, machining and manufacturing methods. The pivot apertures of the anchoring bracket may likewise be characterized by a nominal size, for example, a 3/8" (0.375") diameter hole, but will vary in size therefrom within a dimensional tolerance.

In an assembled condition, the mast 120 of the antenna system 100 is coupled to the anchoring bracket 130 with the pivot apertures 122 of the mast substantially coaxially aligned with the pivot apertures 132 of the anchoring bracket 130. Similarly, the adjustment aperture 124 of the mast 120 is aligned with the adjustment slot 134 of the anchoring bracket 130 such that carriage bolts 140 inserted through the mast 120 ride within the adjustment slot 134. The carriage bolts 140 may be used to selectively secure an end portion of the mast 120 to the bracket 130 by tightening nuts 142. Conventional lock washers 144 may also be used to substantially prevent unintentional loosening of the nuts 142. In this manner, a user can selectively loosen the nuts 142 and pivot the mast 120 about a pivot axis P running substantially coaxially with the pivot apertures 122, 132 to a desired position and lock the end of the mast 120 to the bracket 130 by retightening the nuts 142 once a desired position is located.

When a desired position is reached that may correspond, for example, to an antenna position of maximum signal quality, a threaded fastener (or similar fastener), such as a pivot bolt 150, is used with bushings 200 to selectively secure the mast 120 to the anchoring bracket 130 via the pivot apertures 122, 132. More particularly, the pivot bolt 150 may be selectively tightened to draw the bushings 200 progressively into the pivot apertures 122, 132 and cause the bushings 200 to gradually transition from a first position, in which the bushings 200 are in an unbiased condition, to a second position, in which the bushings constrict around the bolt 150. In the first position, the bushings 200 enable the mast 120 to pivot about the pivot axis P, which is also substantially coaxially aligned with the pivot bolt 150. Conversely, in the second position, the bushings 200 rigidly secure the mast 120 to the pivot bolt 150 and anchoring bracket 130 such that there is substantially no relative movement between the mast 120 and anchoring bracket 130 when subjected to various external loads, such as, for example, loads caused by harsh weather conditions. Accordingly, the bushings 200 enable a user to selectively secure the mast 120 to the anchoring bracket 130 in variable orientations. The bushings 200 are particularly suited for preventing movement at the remote end of the mast 120 (i.e., the end supporting the dish antenna 110) when in the second position by eliminating relatively small displacements at the fixed end of the mast 120. In this manner, the bushings 200 are well adapted to prevent, for example, movement of the dish antenna 110 that may otherwise occur in an antenna system mounted with conventional fastening methods, such as simply clamping components together with a through bolt and nut.

With reference to FIGS. 1E and 1F, a portion of each bushing 200 is generally tapered such that at least a portion of the bushing 200 has a substantially conical outer surface 210. The taper of the bushing 200 enables the bushing 200 to engage multiple components (e.g., mast 120 and anchoring bracket 130) in such a manner that, when the bushing 200 is in the second position, an outer surface of the bushing 200 engages an edge 123, 133 encircling each of a series of apertures 122, 132 having progressively smaller diameters while a portion of the bushing 200 and flexes and/or deforms inwardly towards a central axis. For example, as can be appreciated from FIGS. 1E and 1F, the bushings 200 may be drawn from the first position towards the second position by tightening pivot nut 152 about pivot bolt 150. As the pivot nut 152 is tightened, the bushings 200 are progressively drawn into the pivot apertures 122, 132 and ultimately into rigid engagement with the edges 123, 133 surrounding the apertures 122, 132. FIG. 1E in particular shows the bushings 200 in the first position with the bushings 200 slightly in contact with the edges 123, 133 surrounding the pivot apertures 122, 132 just prior to displacement of a portion of the bushing 200 towards the central axis A. As each bushing 200 is drawn further into the pivot apertures 122, 132, the interaction of the bushing 200 with one or more of the edges 123, 133 forces a portion of the bushing 200 to displace inwardly towards the central axis A towards the second position. When drawn still further into the pivot apertures 122, 132, both edges 123, 133 act upon the bushing 200 to deflect the bushing into rigid engagement with the pivot bolt 150. Consequently, when in the second position, the bushing 200 concurrently engages the edge 123, 133 encircling each aperture 122, 132 and the pivot bolt 150 to substantially prevent relative movement between the mast 120, the anchoring bracket 130 and the pivot bolt 150. In other words, the bushing 200 is configured to constrict around the pivot bolt 150 as it is drawn into engagement with edges 123, 133 of two or more components to rigidly secure the components together. In addition to rigidly securing the components together, the substantially conical outer surface 210 of the bushings 200 also facilitates self-alignment of the components (e.g., mast 120 and anchoring bracket 130) as the bushings 200 are progressively drawn into the pivot apertures 122, 132.

In light of the above, and according to one embodiment, a method for rigidly securing two or more components together is provided. The method includes inserting a first bushing into a first series of successively sized apertures of at least a first and second component; drawing the first bushing progressively into each aperture with a threaded fastener; and deflecting elongated protrusions of the first bushing inwardly towards a central axis to a position in which the elongated protrusions constrict tightly around the threaded fastener while an outer surface of each of the elongated protrusions simultaneously contacts an edge surrounding each respective aperture of the first and second components. Additionally, according to another embodiment, a second bushing substantially identical to the first bushing may be inserted into a second series of successively sized apertures in the first and second components and simultaneously drawn into the second series of apertures while drawing the first bushing progressively into the first series of apertures.

Although the illustrated coupling systems and methods include two substantially identical bushings operating in tandem, a single bushing may be used. The bushings can include a variety of materials, such as zinc, aluminum, and plastics and may be formed using various production methods, such as casting and injection molding. For example, in one embodiment, the bushings 200 are zinc castings.

FIGS. 2 through 3B illustrate a bushing 200, according to one embodiment, that is particularly adapted to substantially prevent relative movement between two or more components that are secured together with the bushing 200. The bushing 200 is conically shaped and has a substantially circular aperture 242 extending through a base portion 240 of the bushing 200 such that a projection of the circular aperture 242 defines a cylindrical path P extending along a central axis A of the bushing 200. The bushing 200 further includes a plurality of elongated protrusions or fingers 230 (hereinafter referred to as fingers) extending from the base portion 240 and circumferentially spaced about the central axis A, and tapering from the base portion 240 towards the end of the bushing 200. More particularly, the bushing 200 includes four fingers 230 circumferentially spaced about the central axis A with each finger 230 having an inner surface 220 defined by an arc having a central angle α (FIG. 3A) of at least forty-five degrees. In this manner, the central angle α of each finger 230 is greater than a central angle β of each notch 234, and thus, the fingers 230 collectively surround more than half of the circumference of the bushing passageway P. In other embodiments, the fingers 230 may collectively surround about half the circumference of the bushing passageway P, and in yet other embodiments, may surround less than half the circumference of the bushing passageway P. The fingers 230 may be circumferentially spaced about the central axis of the bushing 200 in a symmetrical pattern, as shown in FIGS. 2 through 3B, or may be spaced asymmetrically.

Each finger 230 is separated from adjacent fingers 230 by a relief feature, for example, notches 234, such that the fingers 230 may flex and/or deform from the first position towards the central axis A to the second position. The fingers 230 may deform in a substantially elastic manner or may deform plastically. The bushing 200 preferably flexes or deforms elastically so that the bushing 200 may be reused without a substantial reduction in performance. In some embodiments, each notch 234 extends at least half of a length L of the bushing 200, and in some embodiments, the notches extend at least three-quarters of the length L of the bushing 200. The embodiment shown in FIGS. 2 through 3B, for example, has notches 234 that extend about eighty percent of the length L of the bushing 200. As described above, these notches 234 (or other relief features) allow the fingers 230 to flex and/or deform inwardly towards the central axis A, and thereby enable the bushing 200 to constrict around a bolt or other similar fastener that may be inserted through the bushing 200.

More particularly, as shown in FIG. 2, when the bushing 200 is in the first position, an inner surface 220 of each finger 230 is substantially cordially aligned with the aperture 242 in the base portion 240 to thereby enable a bolt (or similar fastener) to be inserted through the bushing 200 without interference. In addition, when in the first position, at least a portion of an outer surface 210 of the bushing 200 is substantially coextensively aligned with a conical reference surface C defined by a taper angle θ (FIG. 3B). Although the taper angle θ may vary, in some embodiments, the taper angle θ is greater than ten degrees and less than forty-five degrees. Conversely, when the bushing 200 is in the second position, a portion of each finger 230 is deflected inwardly towards the central axis A such that the portion of each finger 230 impedes or otherwise penetrates the passageway P. Consequently, when a bolt (or similar fastener) is running through the bushing 200, the fingers 230 may constrict tightly around the bolt to rigidly secure the bushing 200 to the bolt. In this manner, the bushing 200 is configured to be selectively secured to a bolt or other similar fastener inserted therein.

Figure 4:
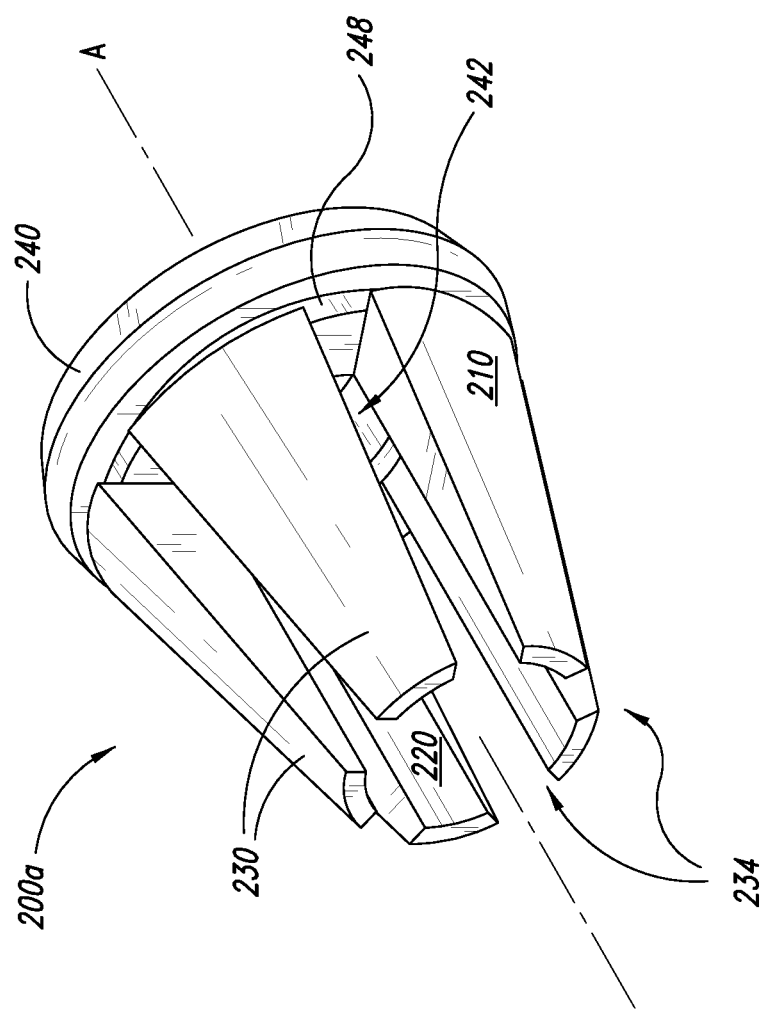
FIG. 4 is an isometric view of a bushing, according to another embodiment.
Figure 5B:
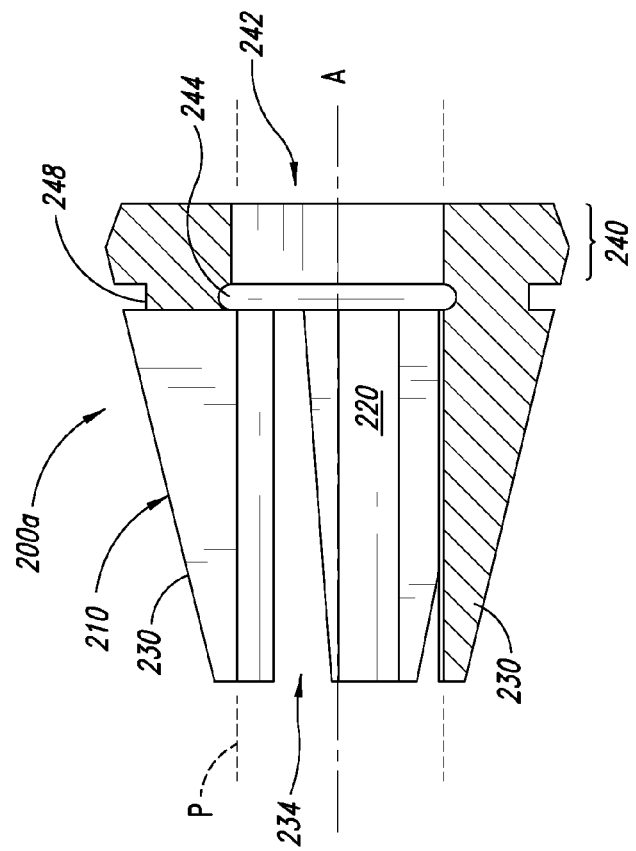
FIG. 5B is a cross-sectional view of the bushing of FIG. 4.
Figure 5A:
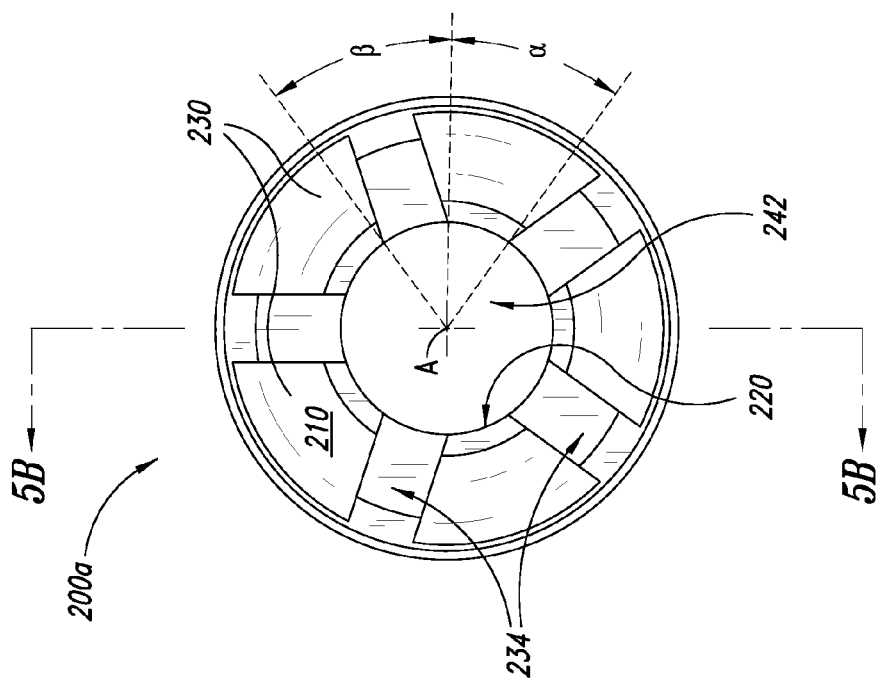
FIG. 5A is front elevational view of the bushing of FIG. 4.

FIGS. 4 through 5B illustrate a bushing 200a for rigidly securing multiple components together, according to another embodiment. The bushing 200a includes five circumferentially spaced fingers 230 extending from a base portion 240 of the bushing 200a with each finger 230 having an inner surface 220 defined by an arc having a central angle α (FIG. 3A) of less than forty-five degrees. In some embodiments, as shown in FIGS. 4 through 5B, the central angle α of each finger 230 is about the same as a central angle β of each notch 234, and thus, the fingers 230 collectively surround about half the circumference of the bushing passageway P. In other embodiments, the fingers 230 may collectively surround more than half the circumference of the bushing passageway P, and in yet other embodiments, may surround less than half the circumference of the bushing passageway P.

As in the discussion above, the fingers 230 are configured to move between a first position, in which a bolt may be readily inserted into the bushing 200a, and a second position, in which the bushing 200a may constrict around the bolt to rigidly secure the bushing 200a thereto. The bushing 200a further includes a relief feature in the form of a square-shaped groove 248 extending circumferentially around the outside of the bushing 200a near a root portion of the fingers 230 and another relief feature in the form of a semi-circular groove 244 extending circumferentially around the inside of the bushing 200a, also near a root portion of the fingers 230. These relief features 244, 248 facilitate the ability of the fingers 230 to flex and/or deform to a relatively greater degree than would be experienced without such features under similar loading conditions.

Figure 6:
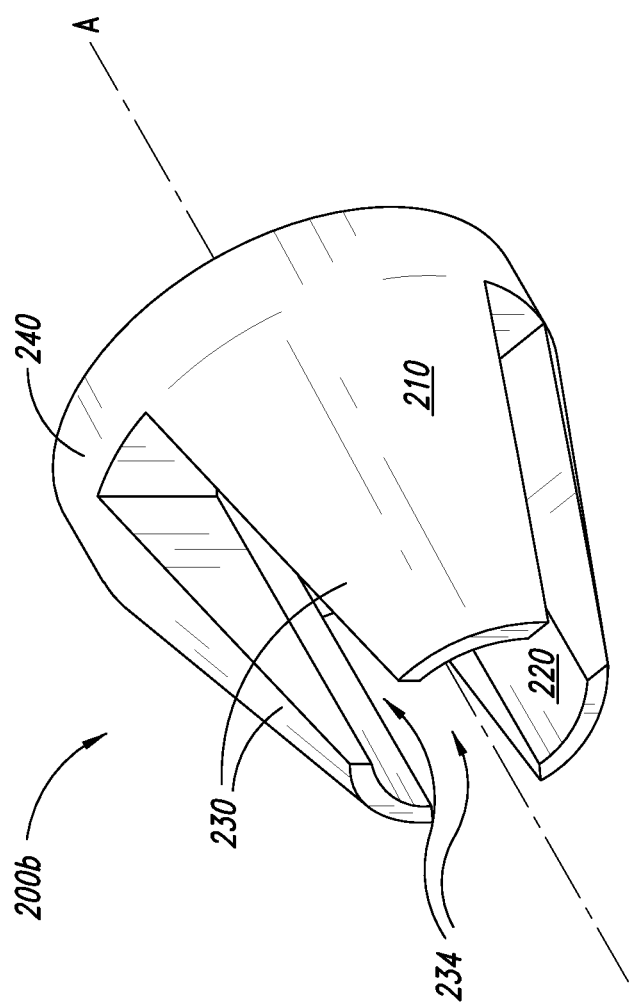
FIG. 6 is an isometric view of a bushing, according to yet another embodiment.

FIGS. 6 through 7B illustrate a bushing 200b for rigidly securing multiple components together, according to yet another embodiment. The bushing 200b includes three circumferentially spaced fingers 230 extending from a substantially cylindrical base portion 240 with each finger 230 having an inner surface 220 defined by an arc having a central angle α (FIG. 3A) of about sixty degrees. In some embodiments, as shown in FIGS. 6 through 7B, the central angle α of each finger 230 is about the same as a central angle β of each notch 234, and thus, the fingers 230 collectively surround about half the circumference of the bushing passageway P. In other embodiments, the fingers 230 collectively surround more than half the circumference of the bushing passageway P, and in yet other embodiments, surround less than half the circumference of the bushing passageway P. As in the discussion above, the fingers 230 are configured to move between a first position, in which a bolt may be readily inserted into the bushing 200b, and a second position, in which the bushing 200b may constrict around the bolt to rigidly secure the bushing 200b thereto. In this manner, as in the embodiments discussed above, the bushing 200b is particularly adapted to substantially prevent relative motion between two or more components that are secured together with the bushing 200b.

Although some of the discussion above is provided in the context of an antenna system 100, it will be appreciated by those skilled in the art that the bushings described herein can be used in a variety of applications to secure two or more components together in a rigid manner. For example, a street sign attached to a tubular pole may be rigidly secured to a mounting foot or bracket located near a street. Accordingly, in some embodiments, a coupling system is provided that includes a base structure (e.g., a tubular mast or other support structure) having a first aperture and a bracket having a second aperture. The coupling system further includes at least one bushing that is adapted to rigidly secure the base structure to the bracket to substantially prevent relative motion therebetween. To facilitate such rigid coupling, as discussed in greater detail elsewhere, the bushing includes a plurality of elongated protrusions or fingers circumferentially spaced about a central axis that are movable between a first position and a second position. In the first position, an inner surface of each elongated protrusion or finger is substantially cordially aligned with a circular aperture of a base portion of the bushing extending along the central axis. On the other hand, when the bushing is in the second position, a portion of each elongated protrusion or finger is deflected from the first position inwardly towards the central axis as the bushing concurrently engages an edge encircling the first aperture of the base structure and an edge encircling the second aperture of the bracket. The coupling system may also include a threaded fastener, such as a standard bolt, that is adapted to progressively draw the bushing into the first and second apertures and transition the bushing from the first position to the second position.

Although the base structure and the bracket of the coupling system described above can include a variety of different sized and shaped structures, in one embodiment, the base structure is a tubular mast that may be secured to an anchoring bracket to support a dish antenna coupled thereto. In such an embodiment, the coupling system is particularly adapted to rigidly secure the antenna via the mast in a desired position such that the quality of a received signal can be maintained at a relatively high standard by preventing signal degradation that may otherwise occur without such rigid attachment.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A coupling system, comprising:
a base structure including a cylindrical pivot aperture having a first diameter located at each of opposing sides thereof, each cylindrical pivot aperture defining a leading edge and a trailing edge in the base structure at opposing ends of the cylindrical pivot aperture;
a bracket having opposing sidewalls, each sidewall including a corresponding cylindrical pivot aperture having a second diameter greater than the first diameter and defining a leading edge and a trailing edge in each sidewall of the bracket at each of the opposing ends of the cylindrical pivot aperture, the base structure provided between the opposing sidewalls of the bracket with the cylindrical pivot apertures of the base structure and corresponding cylindrical pivot apertures of the bracket aligned along a common axis;
a first tapered bushing extending through one of the cylindrical pivot apertures of the base structure and one of the corresponding cylindrical pivot apertures of the bracket and coupling the base structure to the bracket, the first tapered bushing having a base portion with a circular aperture extending therethrough and having a plurality of elongated protrusions circumferentially spaced about a central axis thereof, the elongated protrusions of the first tapered bushing each having an inner surface that collectively define a cylindrical passageway that extends coextensively with the circular aperture of the base portion;
a second tapered bushing extending through the other one of the cylindrical pivot apertures of the base structure and the other one of the corresponding cylindrical pivot apertures of the bracket and coupling the base structure to the bracket, the second tapered bushing having a base portion with a circular aperture extending therethrough and having a plurality of elongated protrusions circumferentially spaced about a central axis thereof, the elongated protrusions of the second tapered bushing each having an inner surface that collectively define a cylindrical passageway that extends coextensively with the circular aperture of the base portion; and a threaded fastener extending through the first and the second tapered bushings, a portion of each of the elongated protrusions of each tapered bushing constricting around the threaded fastener when the threaded fastener is in a tightened configuration while an outer surface of each of the elongated protrusions of each tapered bushing is in contact with a respective one of the leading edges of the base structure defined by a respective one of the cylindrical pivot apertures having the first diameter and in contact with a respective one of the leading edges of the bracket defined by a respective one of the corresponding cylindrical pivot apertures having the second diameter greater than the first diameter, and the respective leading edges of the base structure which encircle the cylindrical pivot apertures and the respective leading edges of the bracket which encircle the corresponding cylindrical pivot apertures being sized relative to each other to contact a respective portion of the outer surface of the elongated protrusions of each respective tapered bushing simultaneously when the threaded fastener is in the tightened configuration such that the bracket and the base structure are rigidly secured together and to the threaded fastener, and wherein the base structure is pivotable about the common axis when the threaded fastener is moved from the tightened configuration to a loosened configuration.

2. The coupling system of claim 1, wherein each of the tapered bushings include at least three elongated protrusions.

3. The coupling system of claim 1, wherein, for each of the tapered bushings, an outer shape of at least a portion of the tapered bushing is substantially conical.

4. The coupling system of claim 1, wherein, for each of the tapered bushings, the outer surface of each of the plurality of elongated protrusions of the tapered bushing is substantially coextensive with a conical reference surface.

5. The coupling system of claim 1, wherein, for each of the tapered bushings, a notch separates each of the elongated protrusions, each notch extending at least half of a length of the tapered bushing in a direction of the central axis.

6. The coupling system of claim 1, wherein, for each of the tapered bushings, the tapered bushing includes a circumferential relief feature proximate a root portion of the elongated protrusions.

7. The coupling system of claim 1, wherein, for each of the tapered bushings, the elongated protrusions collectively surround at least half a circumference of the cylindrical passageway that extends through the tapered bushing.

8. The coupling system of claim 1, wherein the base structure is a tubular mast.

9. The coupling system of claim 8, further comprising: a dish antenna coupled to the tubular mast.

10. A coupling system for a dish antenna assembly, the coupling system comprising:
a set of bushings, each bushing having a base portion with a circular aperture extending therethrough and having a plurality of elongated cantilevered protrusions circumferentially spaced about a central axis, the elongated cantilevered protrusions of each bushing each having an inner surface that collectively define a cylindrical passageway that extends coextensively with the circular aperture of the base portion;
a bracket having a set of opposing cylindrical apertures, each cylindrical aperture defining a leading edge and a trailing edge in the bracket, each respective leading edge having a first diameter sized such that each respective leading edge circumferentially engages the elongated cantilevered protrusions of a respective one of the bushings at a first axial position;
a mast having a set of opposing cylindrical apertures, each cylindrical aperture defining a leading edge and a trailing edge in the mast, each respective leading edge having a second diameter smaller than the first diameter and sized such that each respective leading edge circumferentially engages the elongated cantilevered protrusions of a respective one of the bushings at a second axial position offset from the first axial position; and
a threaded fastener extending through the bushings, the cylindrical apertures of the bracket and the cylindrical apertures of the mast, and the threaded fastener urging the elongated cantilevered protrusions of each respective bushing into contact with the bracket and the mast when the threaded fastener is in a tightened configuration such that the contact of the elongated cantilevered protrusions of the bushing with the leading edges of the bracket and the leading edges of the mast urges the elongated cantilevered protrusions to displace inwardly into simultaneous contact with the threaded fastener to rigidly secure the bracket and the base structure together and to the threaded fastener, and wherein the mast is pivotable relative to the bracket when the threaded fastener is moved from the tightened configuration to a loosened configuration.

11. The coupling system of claim 10, further comprising: a dish antenna coupled to the mast.

12. The coupling system of claim 10, wherein the elongated cantilevered protrusions of each bushing are tapered, and wherein the bushings are positioned so that the elongated cantilevered protrusions of each bushing taper toward each other.

* * * * *